Patented July 4, 1944

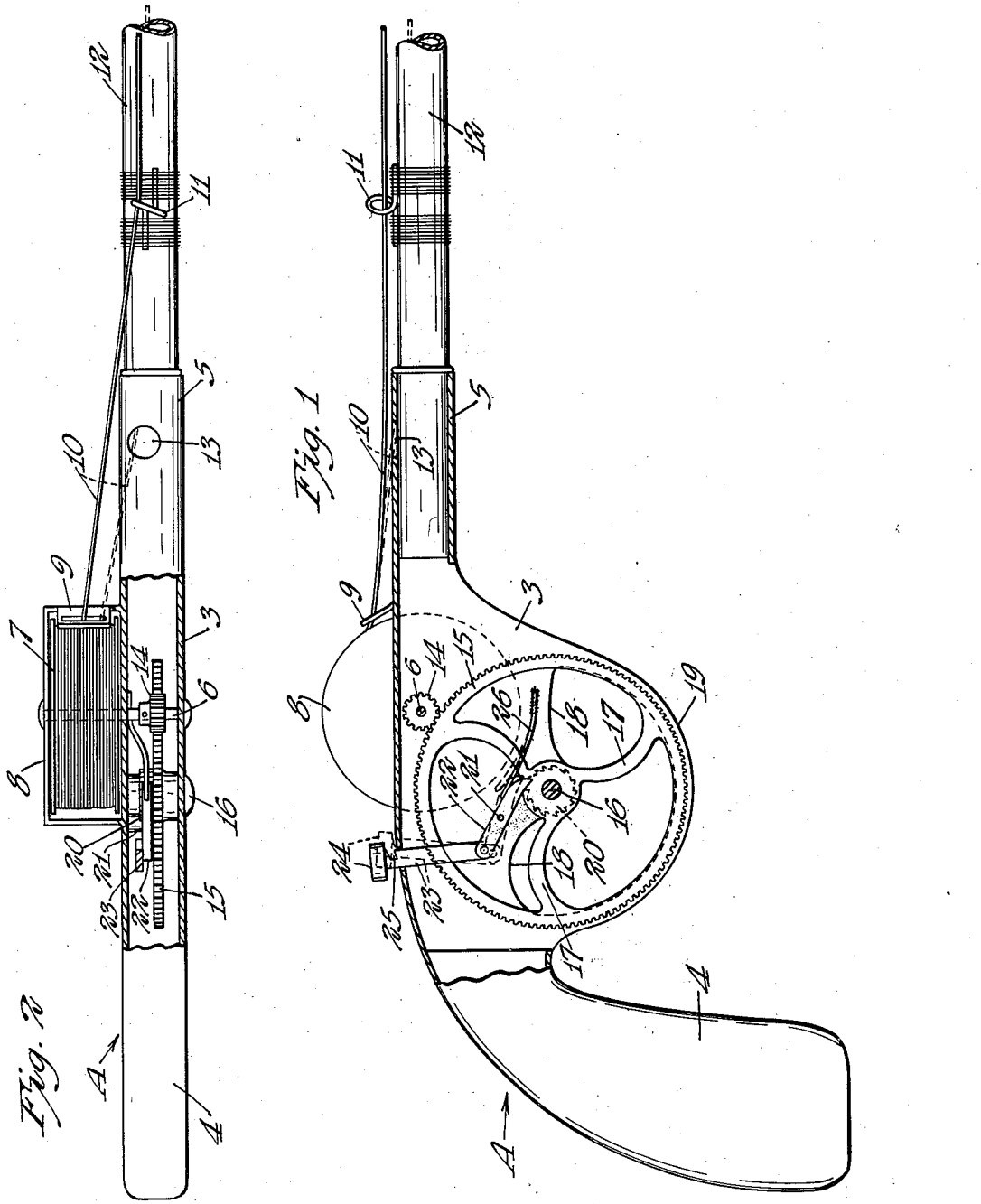

2,352,903

UNITED STATES PATENT OFFICE 2,352,903

FISHING REEL

Ralph R. Lawrenz, Winthrop, Minn.

Application June 11, 1943, Serial No. 490,395

4 Claims. (Cl. 43—23)

This invention relates to fishing reels.

Reels have previously been constructed with means for taking up the slack in a line when playing a fish. Of course, the conventional reel is provided with a crank and certain types of fly fishing reels having spring actuated automatic takeups associated therewith. The conventional hand crank reel requires the use of two hands, one to hold the rod and the other to actuate the crank. The type of reel having an automatic spring takeup is relatively complicated in structure.

It is a general object of my invention to provide a fishing reel associated with a fishing rod handle so that the rod can be held in one hand and slack on the line can be taken up with the same hand holding the rod. This leaves the other hand free to land the fish when it is played into the fisherman.

Another object of my invention is to provide a gear actuated spool associated with a pistol grip rod handle and so related thereto in position that the pistol grip handle can be grasped while the forefinger can be utilized to rotate the spool actuating gear.

Another object of the invention is to provide means for locking the reel to prevent line from paying out and a release for said locking means which is located at the upper portion of the pistol grip so that it can be manipulated with the thumb of the hand that is holding the rod.

These and other objects and advantages of the invention will more fully appear from the following description made in connection with the accompanying drawing, wherein like reference characters refer to the same parts throughout the views, and, in which:

Fig. 1 is a side elevation of my invention with a portion of the handle casing broken away and with a short section of rod in the forward end of the handle, alternate positions of the wheel locking mechanism being shown in dotted and full lines; and Fig. 2 is a top plan of the device with the upper portion of the handle casing and locking button broken away.

The drawing shows a handle A made up of a central casing 3, a rear pistol grip portion 4, and a forward rod receiving sleeve 5. Mounted between the side walls of the central casing 3 and extending outwardly beyond one of said side walls is a shaft 6 on whose outwardly extending end is mounted a reel spool 7. A guard or framework 8 is formed around the reel spool and this guard carries a line guide 9 which is slotted to suitably receive a length of fishing line 10. The line is shown extending forwardly through a guide 11 on the rod section 12 in the usual manner. However, if desired a line could extend through an aperture 13 in the tubular portion 5 of the reel handle and thus forwardly through a suitably equipped hollow fishing rod. The alternate feeding of the line is not, however, an important feature of the invention.

The spool supporting shaft 6 has a small gear 14 mounted thereon in the central casing 3. This small gear 14 meshes with a large gear 15 on a shaft 16 extending between the walls of the central casing 3. It will be noted that the gear wheel 15 is provided with several curved and widely spaced spokes 17, and that as the gear rotates in a clockwise direction, as viewed in Fig. 1, the concave side of each spoke faces forwardly. The central casing 3 is cut away at 18 to permit the finger of the fisherman to extend into the casing and engage the spokes 17 on the large gear 15. However, extending around the lower circumferential portion of the gear 15 is a guard 19 which forms an integral portion of the casing 3.

Mounted on the shaft 16 which supports the large gear wheel 15 is a ratchet wheel 20. Pivotally supported by a stub shaft 21 is a dog 22 having a lever 23 with a knob 24 connected thereto. The lever 23 extends exteriorly of the upper portion of the casing 3 adjacent the top of the pistol grip 4 and the knob 24 is also shown on the outside of the casing. The upper end of the lever 23 is provided with a notch 25 to permit the lever to be hooked onto an edge of the opening in the casing 3 through which said lever 23 extends. A small spring arm 26 has one end fastened to an inner side wall of the casing 3 and the other end rests upon the free end of the dog 22 which is normally swung to engage with the ratchet wheel 20, but can be held out of engagement with said wheel by downward pressure of the knob and lever 23 and hooking of the upper portion of the casing 3 in the notch 25 in said lever 23.

Actuation of the device is extremely simple. When a cast is made the pivoted dog 22 is locked out of position with the locking lever 23 in the dotted position shown in Fig. 1. The large gear wheel 15 and the line spool 7 are then freely rotatable. The cast is made and if there is any slack in the line it can easily be drawn up by merely engaging the spokes 17 of the large gear wheel 15 with the forefinger of the hand that is holding the rod by pistol grip 4. This leaves the other hand entirely free to use the landing net or otherwise assist in landing the fish. When playing a fish it is preferable to disengage the locking lever 23 so that the spring pressed dog 22 will engage the ratchet wheel 20. It is then impossible for the fish to cause the reel to reverse and pay out line.

It will, of course, be understood that various changes may be made in the form, details, arrangement and proportions of the various parts without departing from the scope of my invention.

What is claimed is:

1. In a fishing reel, a casing, a spool supported by said casing and having a shaft extending into the casing, a small gear in the casing on the spool shaft, a large gear wheel in the casing meshing with said small gear, said large gear wheel having widely spaced spokes, and opposite side portions of said casing being cut away to expose a substantial portion of said large gear wheel to allow the finger of the user to engage a spoke of the wheel to rotate the same.

2. The structure in claim 1 and a pistol grip associated with said casing rearwardly of said large gear wheel, and closely adjacent thereto, to permit the hand of the user to hold the grip and to permit a finger of said hand to engage the spokes of said gear wheel to rotate the same.

3. In a fishing reel, a rotary spool, a support therefor, a gear wheel geared to said spool, said gear wheel having relatively widely spaced spokes therein to admit the user's finger between them and permit rotation of said wheel, and a guard about said wheel having an opening therein for admitting the finger of the user to the wheel, said opening being of such size and location relative to said gear wheel as to permit engagement of a spoke of said wheel to rotate the same.

4. In a fishing reel, a handle having a pistol grip, a spool supported by said handle, a gear wheel geared to said spool for actuation thereof and having relatively widely spaced spokes therein to admit the finger of the user for rotation of the gear wheel, said gear wheel being located forwardly adjacent to said pistol grip to permit the forefinger of the user to engage and rotate the wheel and the remainder of the hand of the user to retain said pistol grip, means connected to said gear wheel to prevent reverse rotation thereof, and a release for said means located at the top of said pistol grip for convenient engagement by the thumb of the user.

RALPH R. LAWRENZ.